Aug. 10, 1926.
J. W. SHIELDS
1,595,318
METHOD OF AND APPARATUS FOR DETERMINING THE HYSTERESIS OF RUBBER
Filed June 10, 1922   2 Sheets-Sheet 1
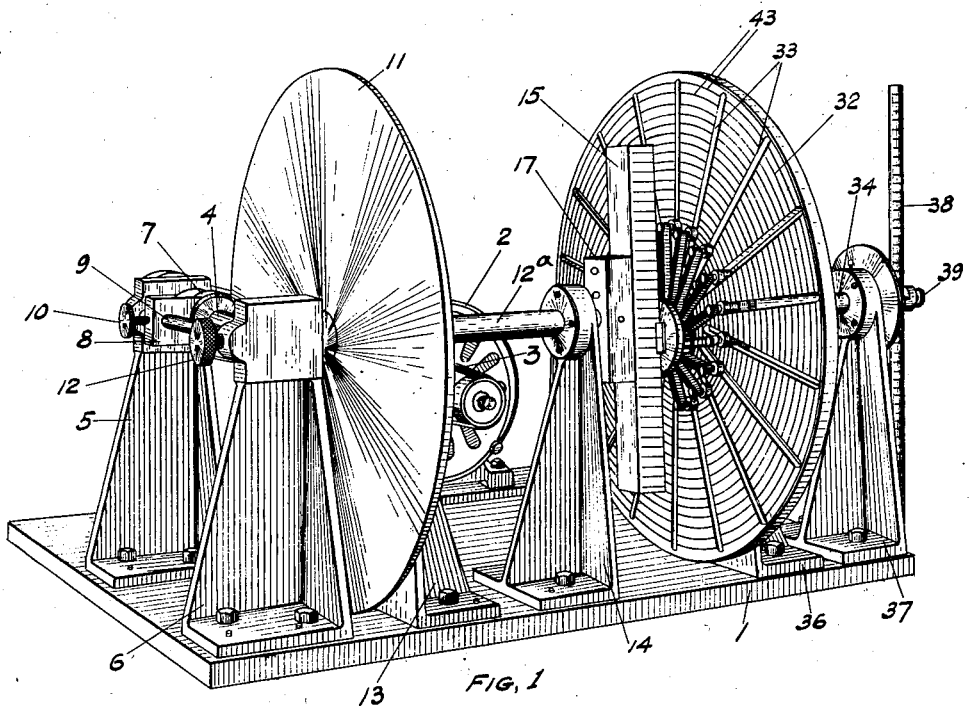
FIG. 1
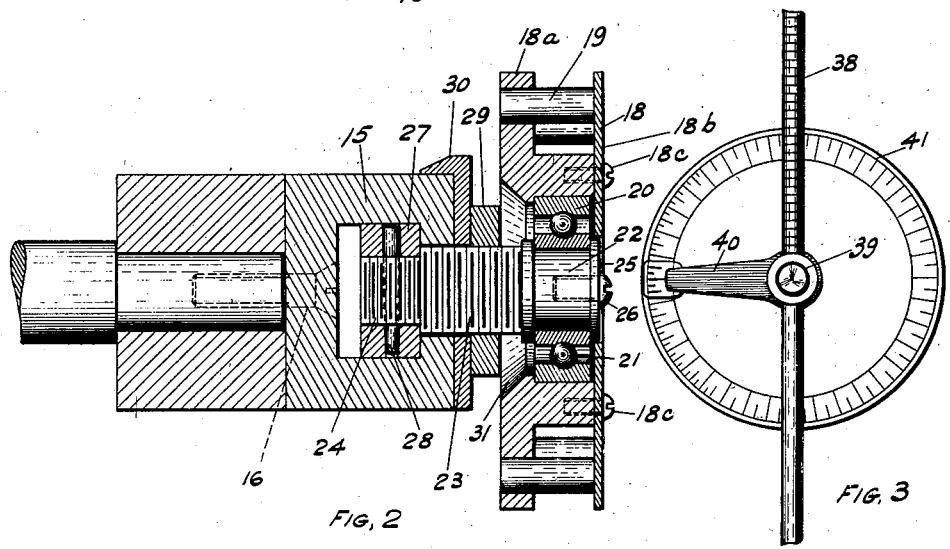
FIG. 2
FIG. 3
Inventor
JESSE W. SHIELDS
By
Attorney Patented Aug. 10, 1926.

1,595,318

UNITED STATES PATENT OFFICE.

JESSE W. SHIELDS, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR DETERMINING THE HYSTERESIS OF RUBBER.

Application filed June 10, 1922. Serial No. 567,485.

My invention relates to methods of and apparatus for determining the hysteresis of rubber and it has, for its primary object, the provision of a machine which may be utilized to measure accurately the ability of rubber specimens to return to their original condition after having been subjected to a tensioning force and such force removed.

It becomes highly desirable, in the manufacture of a great many rubber products, to determine the hysteresis of various rubber compounds inasmuch as an indication may thus be obtained of how rapidly the rubber will become heated upon being subjected to flexing strains. The differential of the energy input and energy output is the hysteresis of the rubber and it is evidenced by heating of the material. A test may be made by starting with a certain initial elongation and effecting a further elongation, or by subjecting the rubber to a tensioning force from a relaxed condition.

It will be appreciated that, particularly in the manufacture of such rubber products as rubber tires, it is highly desirable to predetermine how rapidly a certain rubber compound will become heated under rapidly acting and recurring forces, which cause compression and tensioning of the rubber. It is well known, for example, that if a suitable compound is not utilized in the contruction of solid rubber tires, they become so heated in operation as to produce a porous condition in the rubber compound, and in aggravated cases the rubber will actually blow out, forming large cavities in the tires.

The principal object of my invention is to provide apparatus by means of which the hysteretic characteristics of rubber may be quite accurately determined and utilized in finding the most suitable rubber compound for articles that are to be subjected to conditions which will tend to cause the rubber to heat.

With these and other objects in view, my invention will be more fully described, illustrated in the accompanying drawings, in which like numerals indicate corresponding parts, and then more fully pointed out in the appended claims.

In the drawings:

Fig. 1 is a perspective view of apparatus constructed in accordance with my invention for determining the hysteresis of rubber;

Fig. 2 is a detail view, partially in section and partially in elevation, of a portion of the machine shown in Fig. 1, which is utilized to mount rubber specimens upon the machine;

Fig. 3 is a plan view of a scale by means of which measurements may be accurately taken upon the machine shown in Fig. 1, and from which calculations may be made to determine the hysteresis of the rubber under test.

Figure 4:
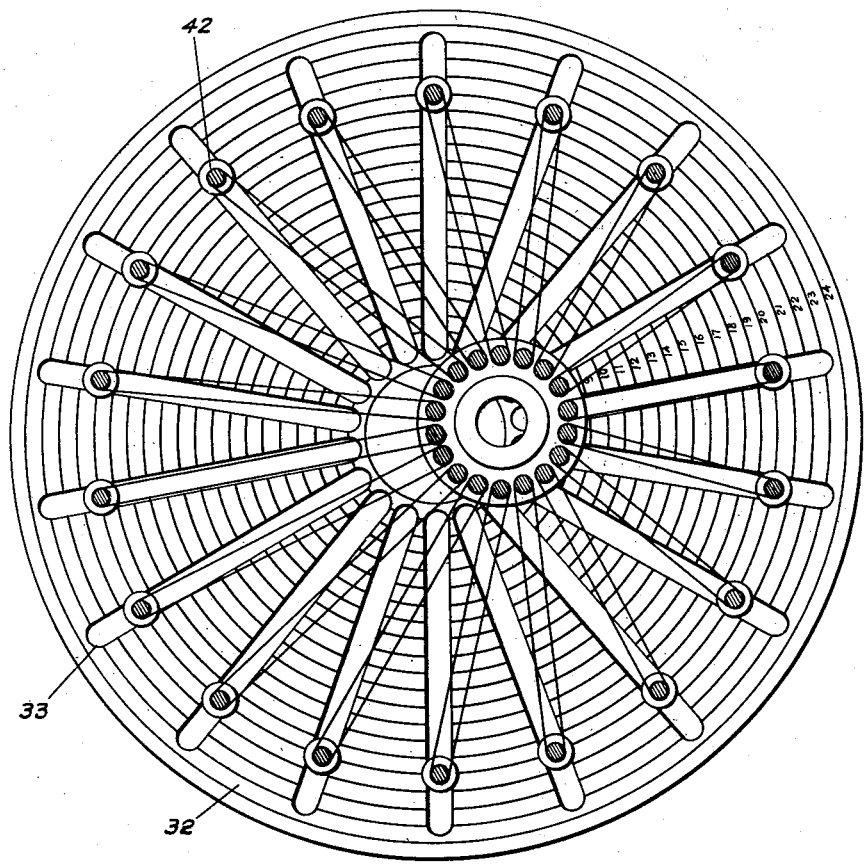
Fig. 4 is an elevation of a disc that is also utilized in mounting specimens for test upon the machine.

In construction apparatus in accordance with my invention, I utilize a plurality of members upon which rubber specimens may be mounted under various degrees of tension. Any suitable means for driving a shaft may be utilized upon which one of the mountings for the specimens is carried, preferably in eccentric relation, whereby tension may be applied progressively to a number of rubber specimens. One of the mountings for the specimens is adapted to rotate but is not positively driven, its only movement being effected by the difference in the action of the rubber specimens as they are subjected to tension and permitted to relax. If the specimens under test possess the ability of returning rapidly enough to the exact condition they were in before being subjected to tension, the rotatable member will not be caused to move. However, a difference in the energy expended to tension the specimens from that returned by their contraction effects a movement of the member, which is measured and utilized in determining the hysteresis of the rubber compound. It will be appreciated also from the following description that the machine of my invention is susceptible of such variations in testing rubber specimens that accurate results may be easily obtained.

In order to insure a clear and accurate understanding of my invention, a machine is shown in Fig. 1 comprising a base plate 1 upon which is mounted a driving motor 2 of any suitable design. The motor 2 is connected by a belt 3 to a shaft 4 carried in bearings on standards 5 and 6. In order to provide for variable speeds, a friction drive wheel 7 is slidably mounted upon the shaft 4 and is adapted to be moved thereupon by a member 8 slidably mounted upon a rod 9, also carried by the standards 5 and 6. The member 8 is secured in any adjusted position upon the rod 9 by means of a set screw 10. The drive shaft 4 is preferably loosely mounted in a bearing on the standard 6 and is positioned in operative relation to a drive disc 11 by means of a set screw 12. It will be apparent, of course, that variable speeds may readily be obtained by so sliding the friction wheel 7 along the shaft 4 as to engage the drive disc 11 at various distances from its center.

The drive disc 11 is mounted upon one end of a drive shaft 12$^a$ which is carried by a plurality of standards 13 and 14 mounted upon the base plate 1. An elongate member 15 is mounted upon the opposite end of the drive shaft 12$^a$ by being secured by screws 16 to a block 17 mounted upon the end of the shaft. A better understanding of the construction of the member 15 may be had from Fig. 2. As here shown, the member 15 is channeled and a rotatable member 18 is mounted thereon comprising an annular member 18$^a$ having a plurality of pins 19 attached about its periphery. A plate 18$^b$ is secured to the face of the member 18$^a$ by means of screws 18$^c$ whereby rubber bands may be disposed and maintained upon the pins 19. The member 18$^a$ is carried by a central bearing member 20 which is adapted to rotate upon ball bearings 21. The member 18 is mounted upon the elongate member 15 by means of a stud 22 which has a threaded surface 23 terminating in a reduced threaded end 24, the member 18 being secured upon the stud 22 by means of a washer 25 and a screw 26. The reduced end 24 is disposed in the channel provided in the member 15, and a nut 27 is screwed upon the end 24, the nut being secured against displacement by means of a pin 28 disposed in an opening provided in the nut and in the end of the stud, as clearly shown in the drawings. A lock nut 29 is disposed upon the threaded surface 23 and engages an indicating slide member 30, which, in turn, engages the member 15. It will be appreciated that the nut 29 is caused to force the member 30 against the member 15 and draw the nut 27 against the interior wall of the member 15 to thereby lock the stud in position in the member 15. In order to provide for loosening the nut 29, the member 18 is provided with a frusto-conical recess 31 on its inner face, whereby the nut 29 may be turned into the recess and thus permit of the disengagement of the various parts.

From the foregoing description it will be seen that the member 18 is adapted to rotate freely about its own axis, which is the stud 22, as well as to revolve about the drive shaft 12 as an axis. Furthermore, it should be noted that the member 18 may be mounted in various degrees of eccentricity with respect to the driving shaft 12$^a$ by sliding the mounting for the member along the elongate member 15, which is provided with marks that may be registered with a mark upon the member 30, thus indicating any desired setting of the parts.

A disc 32, provided with radial slots 33, is mounted upon a shaft 34 carried by standards 36 and 37 disposed upon the plate 1. The shaft and disc are so mounted as to be free to rotate, and one end of the shaft 34 is provided with an opening in which an elongate bar 38 is secured by means of a set screw 39. The end of the shaft also carries an indicating arm 40 which is adapted to travel around a scale 41 mounted upon the standard 37. A plurality of pins 42 are adapted to be mounted in the radial slots 33 of the disc 32, and provide means for securing rubber specimens to the disc. A plurality of circular marks 43 are made upon the disc 32 to permit of properly setting the pins 42 in any desired spaced relation with respect to each other and with regard to the center of the disc.

In operating the above described machine, a number of rubber specimens, preferably rubber bands, are disposed upon the pins 19 of the member 18 and secured to adjacent pins 42 mounted in the radial slots of the disc 32. The member 18 is ordinarily disposed in eccentric relation to the drive shaft 12$^a$, whereby one or more of the rubber specimens is in relaxed condition while the remaining specimens are being subjected to a definite tension. The pins are adjustably mounted upon the disc 32 in order to provide for various degrees of elongation of the rubber specimens under test. The driving mechanism is then started by disposing the friction drive wheel 7 in engagement with the disc 11 to obtain a suitable speed, which of course, will effect rotation of the elongate member 15 and consequently of the member 18. The rubber bands may also be slightly lubricated to permit them to slide upon their mountings, and the force applied to them only effects a tensioning of the specimens inasmuch as the member 18 is also free to rotate upon its own axis.

When rubber specimens are thus mounted upon the machine and a progressive tensioning force applied to the rubber specimens by rotating the eccentrically mounted member, the disc 32 will be caused to move or rotate a certain amount because of the difference in the energy required to tension the bands from that returned by their contraction. The degree of movement of the disc 32 may be read by means of the indicating arm 40 traveling around the scale 41, and this angle of travel of the disc is utilized in calculating the hysteresis of the rubber specimens under test.

The purpose of the bar or rod 38 is to vary the turning movement of the disc 32. The rotative movement of the disc may be accentuated to provide a larger reading upon the scale 41 and permit of greater accuracy in the determinations. This is accomplished by moving the bar in a vertical direction so as to raise or lower the center of gravity of the disc, the relative position of the bar being indicated by markings placed thereupon. For example, when a small degree of eccentricity is utilized in mounting the member 18, a very small movement of the disc 32 will be effected, and since a small reading upon the scale 41 creates more difficulty in obtaining accurate results, it is desirable in such instances to increase the movement of the disc by raising its center of gravity by means of the adjustable bar 38.

In order to determine the hysteresis of the specimens under test I have developed the following formulæ:

$$Kg - cm/cm^3 = \frac{WL \sin R 2\pi}{Vn}$$

$$Kg - cm/cm^3 = \frac{6.29 \, WL \sin R \text{ specific gravity of specimens}}{\text{Total weight of specimens}}$$

$$Kg - cm/cm^3 Vnv = Kg - cm/\text{sec.}$$
$$WL \sin R 2\pi V = Kg - cm/\text{sec.}$$
$$\therefore Kg - cm/cm^3 Vnv = WL \sin R 2\pi V$$

$$Kg - cm/cm^3 = \frac{WL \sin R 2\pi V}{Vnv}$$

$$Kg - cm/cm^3 = \frac{\sin R WL 2\pi}{Vn} = h$$

$Kg - cm/cm^3 =$ kilogram-centimeters per cubic centimeter of rubber.
$R =$ angle through which pendulum moves from perpendicular.
$N =$ number of strips.
$L =$ length of pendulum to center of gravity in centimeters.
$W =$ weight of pendulum in kilograms.
$v =$ velocity in revolutions per second.
$V =$ volume of one strip in cubic centimeters.
$h =$ hysteresis per cubic centimeter per cycle expressed in kilogram-centimeters.

Since the formulæ are self-explanatory it is not deemed necessary to enter into any further explanation than is set forth therein.

It will be appreciated that the machine herein described is not confined to any particular driving mechanism to obtain various speeds, nor is it confined to the exact assembly or construction of the various elements utilized, since the principle of the machine may be embodied in various types of structures. However, the structure set forth in the description and in the drawings has been found to produce very satisfactory results, and since the construction is simple, such a form may be adopted to advantage.

Although I have shown and described a machine and a method of utilizing the machine to determine the hysteresis of rubber specimens, it is obvious that its application may be extended to other elastic materials and that minor changes may be made in the construction of the machine and in its manner of application without departing from the spirit or scope of my invention, and I desire, therefore, that no limitations shall be imposed except such as are indicated in the appended claims.

What I claim is:

1. A method of determining the hysteresis of elastic materials that comprises subjecting the material to a tensioning force, releasing the tensioning force, and measuring the differential of energy resulting from the elongation and contraction of the material.

2. A method of determining the hysteresis of rubber that comprises applying a tensioning force to a plurality of rubber bands at regularly recurring intervals, and measuring the differential of energy resulting from the elongation and contraction of the bands.

3. A method of determining the hysteresis of rubber that comprises maintaining a plurality of rubber bands under varying degrees of tension, changing the extent of the tension uniformly in all of the bands at regularly recurring intervals, and continuously measuring the differential of energy resulting from the elongation and contraction of the bands.

4. A machine for measuring the hysteresis of rubber comprising means for applying a tensioning force to rubber, and means for measuring the difference in energy expended in its elongation from that returned by its contraction.

5. A machine for measuring the hysteresis of rubber comprising means for applying a tensioning force to rubber at periodic intervals, and means for measuring the energy loss in the contraction of the rubber.

6. A machine for measuring the hysteresis of rubber comprising means for mounting a plurality of strips of rubber, means for applying a tensioning force progressively to the strips, and means for measuring the difference in the energy expended from that returned by the contraction of the strips.

7. A machine for measuring the hysteresis of rubber comprising a plurality of relatively movable members, means for mounting a plurality of bands of rubber upon the members, means for rotating one of the members whereby a tensioning force is progressively applied to the bands, and means for measuring the difference in the energy expended from that returned by the contraction of the bands.

8. A machine for measuring the hysteresis of rubber comprising a plurality of relatively movable members, means for mounting a plurality of bands of rubber upon the members, means for rotating one of the members whereby a tensioning force is progressively applied to the bands, and means attached to one of the movable members to indicate the extent of its movement.

9. A machine for measuring the hysteresis of rubber comprising a plurality of relatively movable members, means for adjustably mounting a plurality of bands of rubber upon the members, means for rotating one of the members whereby a tensioning force is progressively applied to the bands, and means for measuring the energy loss resulting from such operation.

10. A machine for measuring the hysteresis of rubber comprising means for applying a tensioning force to rubber at periodic intervals, means for varying the degree of the force, and means for measuring the differential of energy resulting from the consequent elongation and contraction of the rubber.

11. A machine for measuring the hysteresis of rubber comprising a rotatable member, means for rotating the member, a second rotatable member, means for adjustably mounting a plurality of rubber bands upon the members, and means for indicating the extent of rotation of the second member.

12. A machine for measuring the hysteresis of rubber comprising a drive shaft, a member adapted to be eccentrically mounted thereon, a second member rotatably mounted adjacent the first member, adjustable means for securing rubber bands between the members, and means connected to the rotatable member for indicating the amount of its rotative movement.

13. A machine for measuring the hysteresis of rubber comprising a drive shaft, a member adapted to be eccentrically mounted thereon, means for varying the degree of eccentricity of the member, a second member rotatably mounted adjacent the first member, adjustable means for securing rubber bands between the members, and means connected to the rotatable member for indicating the amount of its rotative movement.

14. A machine for measuring the hysteresis of rubber comprising a drive shaft, means for driving it at various speeds, a member adapted to be eccentrically mounted upon the drive shaft, means for varying the degree of eccentricity of the member, a second member rotatably mounted in juxtaposed relation to the first member, adjustable means for securing rubber bands between the members, and means connected to the second member for indicating the amount of its rotative movement.

15. A machine for measuring the hysteresis of rubber comprising a drive shaft, means for driving it at different rates of speed, an elongate member secured to the free end of the drive shaft, a rotatable member slidably mounted upon the elongate member, a second member rotatably mounted in juxtaposed relation to the other rotatable member, adjustable means for securing rubber bands between the rotatable members, and means connected to the second member for indicating the amount of its rotative movement.

16. A machine for measuring the hysteresis of rubber comprising a drive shaft, means for driving it at different rates of speed, an elongate member secured to the free end of the drive shaft, a rotatable member slidably mounted upon the elongate member, a second member rotatably mounted in juxtaposed relation to the other rotatable member, adjustable means for securing rubber bands between the rotatable members, means connected to the second member for indicating the amount of its rotative movement, and means for varying the turning moment of the second rotatable member.

In witness whereof, I have hereunto signed my name.

JESSE W. SHIELDS.